United States Patent [19]

Joseph

[11] Patent Number: 5,542,347
[45] Date of Patent: Aug. 6, 1996

[54] FRY PAN COOKING SHIELD AND METHOD

[76] Inventor: William G. Joseph, 3512 Fairway La., Orlando, Fla. 32804

[21] Appl. No.: 407,873

[22] Filed: Mar. 20, 1995

[51] Int. Cl.⁶ ............................ A23L 1/00; A47J 37/10
[52] U.S. Cl. ...................... 99/422; 99/645; 126/299 C; 126/373; 220/4.03; 220/731; 220/912
[58] Field of Search ........................ 99/422, 341, 340, 99/426, 645; 126/299 C, 373, 383, 384; 206/547; 220/4.03, 252, 334, 731, 912; D7/391, 392.1, 402; 426/523

[56] References Cited

U.S. PATENT DOCUMENTS

| | | |
|---|---|---|
| 656,855 | 8/1900 | Pimlott . |
| 1,682,095 | 8/1928 | Reyther . |
| 2,148,181 | 2/1939 | Andreolo . |
| 2,488,215 | 11/1949 | Mayne . |
| 2,496,121 | 1/1950 | Dement et al. . |
| 2,506,957 | 5/1950 | Gomez . |
| 2,611,510 | 9/1952 | Willits . |
| 2,614,718 | 10/1952 | Loop . |
| 2,680,532 | 6/1954 | Mitchell . |

*Primary Examiner*—Timothy F. Simone
*Attorney, Agent, or Firm*—Allen, Dyer, Doppelt, Franjola & Milbrath, P.A.

[57] ABSTRACT

Arcuate shield segments form a collar around the perimeter of a frying pan cooking surface while suspended within the pan side walls for containing splattering grease within the fry pan. Tabs extending from lower edge portions of the shield segments permit attachment to pans having various size openings. Multiple shield segments are removably attached to each other and aligned to surround the pan cooking surface. The segments are removably attached such that a handle removes all segments simultaneously or a single segment when access through the shield wall is desired. Each segment is dimensioned for convenience in cleaning and storage of the multiple segments.

24 Claims, 3 Drawing Sheets

FRY PAN COOKING SHIELD AND METHOD

BACKGROUND OF INVENTION

1. Field of Invention

This invention relates to a shield for mounting to a frying pan to prevent undesirable splattering of grease onto a stove top and adjacent surfaces.

2. Background Art

The problem of splattering grease onto adjacent cooking area surfaces can be solved by using a deep pot having side walls sufficiently high above a cooking surface for preventing the splattering grease for exiting the pot. Such is seldom an acceptable solution since the high side walls make it difficult and certainly inconvenient to use a spatula for turning the food or generally accessing the food cooking on the pot cooking surface.

Over the years, various devices have been developed along with alternate cooking methods for addressing the problem of limiting the undesirable splattering. U.S. Pat. No. 2,488,215 issued to C. W. Mayne discloses a vapor discharging frying pan cover formed to prevent the splattering of grease while providing for the inspection of the contents within the pan over which the cover is placed. The cover includes a vertical wall of circular curvature extending partially around the pan perimeter. A peripheral flange element dimensioned for engaging an upper edge of the frying pan extends along the wall lower edge. The flange is sufficiently wide for receiving various sized pans. At the upper end of the wall, a flat disc shaped top plate is affixed. Front vertical edges of the wall and top plate delimit an opening at the front of the cover to provide for escape of vapors and access to the cooking surface.

U.S. Pat. No. 2,611,510 issued to H. H. Willits discloses a grease shield for skillets having a shield body of resilient sheet metal and arcuately-curved about an interval of approximately 180 degrees, with a radius approximately the same as the radius of curvature of the skillet rim on which the shield is to be used. Tabs of U-shaped cross-section extend outwardly from the bottom edge of the shield body to receive the rim of the skillet.

U.S. Pat. No. 2,614,718 issued to H. K. Loop discloses a pan shield having a base ring which is adapted to loosely engage within the frying pan while resting upon the pan cooking surface. Dome-shaped shield members are fixed to the ring and are pivotally mounted for exposing the cooking surface.

SUMMARY OF INVENTION

A frying pan shield comprises a shield segment set having walls formed substantially about a pan perimeter portion within a pan side wall inside surface. Each segment wall extends generally perpendicular to a pan bottom surface, wherein each shield segment wall receives splattering grease from food cooking on the bottom surface and permits the grease to flow along its walls onto the bottom surface. Each shield segment further has generally vertical side edges proximate a corresponding shield side edge for enclosing the pan bottom surface within the shield side walls. Each shield segment further having lower and upper side edges, the lower edges closely fitting within the pan perimeter portion, the upper edges in combination forming a top opening for the shield. Each shield segment has means for removably connecting the shield segments to each other, wherein the connecting means holds one side edge along an adjacent side edge.

The shield further comprises means for removably coupling the shield segments to the pan side walls, the coupling means suspending the segments above the pan bottom surface, and further holding the segments proximate the pan side wall inside surface. In a preferred embodiment of the invention, the suspending means comprise extension tabs integrally formed within segment lower edges. The tabs are formed from partially cut out lower edge segments formed for coupling onto a pan side wall top edge. Again, in the preferred embodiment, the connecting means comprise a generally hooked shaped tab extending from one side edge portion. The tab engages a slot formed within a top edge portion of an adjacent segment.

Handle means for removable attachment to the shield is also provided. The handle means is used for manipulating at least one shield segment of the shield segment set. The handle means is one embodiment comprises one shield segment having a hole proximate its top edge, a handle having a gripping end and an opposing attachment end, a rod extending from the attachment end, the rod dimensioned to be received by the hole, a stop affixed to the rod for limiting penetration of the rod into the hole, and hook means extending from the attachment end, the hook means dimensioned for extending over one segment top edge and cooperating with the rod for removably attaching the handle means to that shield segment. In operation, the rod penetrates the hole while biasing the stop against a segment outside wall. The hook means biases against the segment inside wall while lifting the segment.

In one embodiment of the present invention, each shield segment forms a generally rigid arcuate shape for cooperating with an arcuate pan side wall portion, each segment cooperating with the cooperating side wall portion for shielding areas outside the pan from grease splattering over the pan side wall portion. In the preferred embodiment of the present invention, each shield segment is made from a material sufficiently flexible for forming a shape in an operable shield position defined by the pan side wall perimeter shape yet sufficiently rigid for holding its formed shape.

A method of the present invention provides for confining food splattering to within a frying pan thus preventing the splattering from covering adjacent areas outside the pan and comprises the steps of placing a frying pan upon a cook top for preparation of food within the pan, placing first shield segments about a pan first perimeter side wall portion for resting within the pan side wall wherein the splattering received by the shield segment flows downward and onto a pan bottom surface, the first shield segments placing step providing access to the pan bottom surface over a second remaining perimeter side wall portion, and placing a second shield segment within a remaining perimeter side wall portion for fully surrounding the pan bottom surface. In continuing steps, the food is placed onto the cooking surface. By attaching a handle to one shield segment, typically indirectly heated during the cooking step, the second shield segment is removed for accessing the food through an opening formed within the shield by passing a utensil, such as a spatula, through an opening formed within the shield by such removal. The present inventive method steps further includes replacing the shield second segment while holding the handle for maneuvering the shield second segment, and removing the handle from the shield second segment for continuing the cooking step. Further, attaching the handle to the shield first segment accommodates removing the shield, all shield segments, form the pan.

The method further comprises the step of attaching shield segment extension tabs onto pan side wall top portions for suspending the shields above the pan bottom surface. The extension tabs extending generally radially outward from shield lower edge portions. In a preferred method, the shield placing steps further comprise the step of aligning the shield lower edges for providing a contiguous collar about the pan cooking surface. In the preferred embodiment of the invention wherein tab pairs are provided at lower portions of the segment side edges, the aligning step further comprises the steps of placing one shield segment edge between tabs of a bifurcated tab pair for holding that edge within the tabs. The tab pair extending outward from the shield side edge within an extending plane of the shield.

In a preferred embodiment, the placing steps further comprise the step of forming each shield segment for cooperating with a pan side wall contour, the shield segments sufficiently flexible for forming each shield yet sufficiently rigid for holding the contour.

It is therefore a primary object of the present invention to prevent splatter onto a stove top and adjacent surfaces from foods cooking within a frying pan. It is further an object of the invention to provide a shield which substantially encircles a pan cooking surface. It is yet another object of the invention to provide convenient access to cooking food through a side wall portion of the shield. It is another object of the invention to removably attach the shield within side walls while suspending the shield out of direct contact with the cooking surface. It is further an object of the invention to provide use of the shield with pans having various side wall configurations. To accommodate handling of the shield, it is a further object of the invention to provide a removably handle which cooperates to remove the entire shield or portions thereof. The shield, with its portions cooperating to define the shield, is to be lifted using the handle at one position of the shield, and a shield portion to be individually lifted using the handle in a second position for removing or replacing that individual portion. It is also an object of the invention to provide for easy assembly and disassembly of shield portions for operation during cooking steps, cleaning steps and storing.

BRIEF DESCRIPTION OF DRAWINGS

A preferred embodiment of the invention and its operation are described by way of example with reference to the accompanying drawings in which:

FIG. 4 is a partial cross-sectional view of a shield segment lower edge portion and inclined frying pan side wall;

FIG. 5 is a partial cross-sectional view of V—V of FIG. 1 for a shield segment tab useful in suspending the shield above the pan bottom cooking surface;

FIG. 6 is a partial cross-sectional view of VI—VI in FIG. 8 for shield segment side edge portions illustrating alignment of adjacent segment edges using tab pairs;

FIG. 7 is a partial cross-sectional view of VII—VII in FIG. 1 for shield segment connecting means, hook and slot assembly of the preferred embodiment of the present invention;

FIG. 9 is a perspective top end view of the handle of the preferred embodiment;

FIG. 10 is a partial side view of the handle cooperating with the shield segment for removably attaching the handle to the shield;

FIG. 11 is a partial side view of the handle in an affixed position for maneuvering the shield segment.

DETAILED DESCRIPTION OF PREFERRED EMBODIMENT

Figure 1:
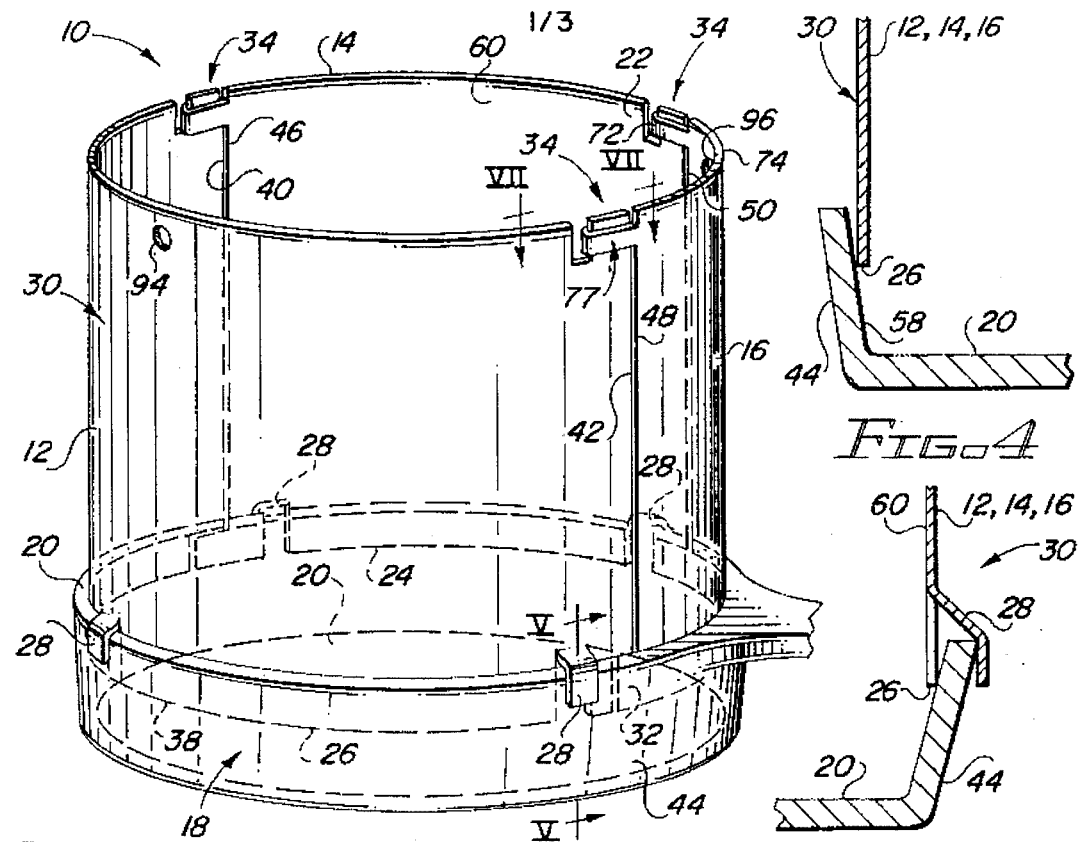
FIG. 1 is a top side perspective view of the preferred embodiment of the invention in combination with a frying pan.

The preferred embodiment of the invention, a frying pan collar or shield 10, as illustrated with reference to FIG. 1, comprises first, second, and third 12, 14, and 16 shield segments respectively for cooperating with a frying pan 18 for preventing splattering of food or grease from within the pan 18 onto a stove top or adjacent cooking surfaces (not shown). Each segment 12, 14, and 16 extends generally upward from and perpendicular to a pan cooking surface 20 and in combination for a shield top opening 22. An opening 24 formed by the shield lower edge 26 is suspended above the pan cooking surface 20 using extension tabs 28 partially cut from the shield wall 30 proximate the lower edge 26 at various locations about the opening 24. As further illustrated with reference to FIG. 1, and as will be further detailed later in this section, the segments 12, 14, and 16 are removably attached and aligned to each other along their respective side edges using a bifurcated tab pair 32 which receives an adjacent segment side edge and a hook and slot assembly 34 which attaches each segment at its side edge proximate the shield top opening 22.

To address each segment 12, 14, and 16 in further detail, and by way of example, consider the first shield segment 12 as having a top edge 36, a bottom edge 38, and left and right side edges 40, 42 respectively cooperating to form a generally rectangular shaped segment 12 when formed into a flat plan configuration. The segments 12, 14 and 16 take on a generally arcuate shape as defined by pan side walls 44 within which the segments 12, 14, 16 are positioned as illustrated again with reference to FIG. 1.

Figure 2:
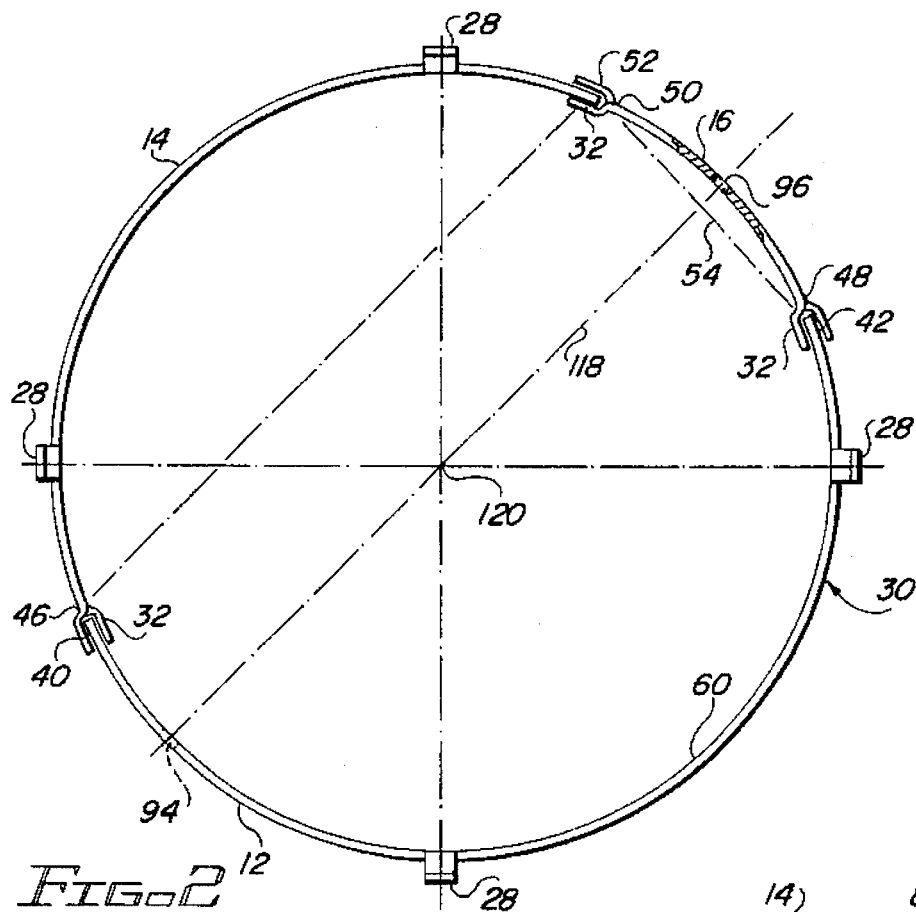
FIG. 2 is a bottom view of the shield of FIG. 1.

Again with reference to FIG. 1 and with reference to FIG. 2, a bottom view of the shield 10, it is appreciated that the side edges 40, 42 of the first segment 12 are then joined with side edges of adjacent segments (first segment left side edge 40 with second segment right side edge 46, and first segment right side edge 42 with third segment left side edge 48). In the preferred embodiment having three segments 12, 14, and 16, the joining of third segment right side edge 50 with second segment left side edge 52 causes the segments 12, 14, and 16 in combination to fully surround the pan cooking surface 20 and thus provide a full shielding for preventing splattering onto the adjacent cooking surfaces as is a primary object of the present invention. It is appreciated that reference to left and right is based on a view of the shield 10 from outside the shield 10 and is for convenience in description only.

Figure 12:
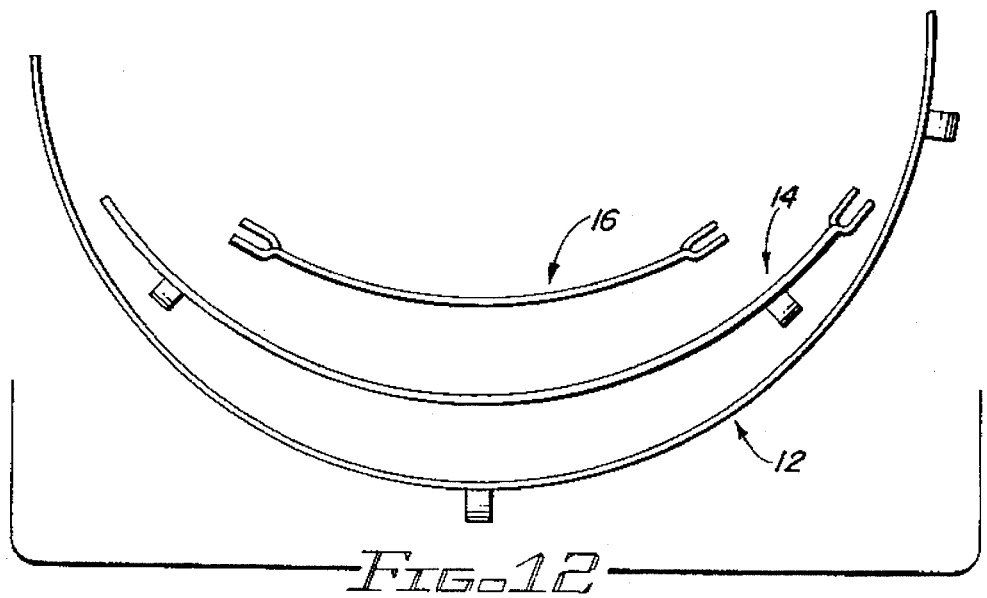
FIG. 12 is a bottom view of a nesting set of shield segments.

In the preferred embodiment of the present invention, it is anticipated that the shield segments 12, 14, 16 will be fabricated from sheet aluminum or sheet stainless steel for ease in cleaning. The material used is sufficiently flexible for forming to a pan of choice about the pan perimeter and sufficiently rigid for holding a generally permanent shape into which it was formed. Further, and with reference to FIG. 12, in the present invention, the arcuate, generally semicircular segments 12, 14, 16 are nested within each other for convenience in storage.

Figure 3:
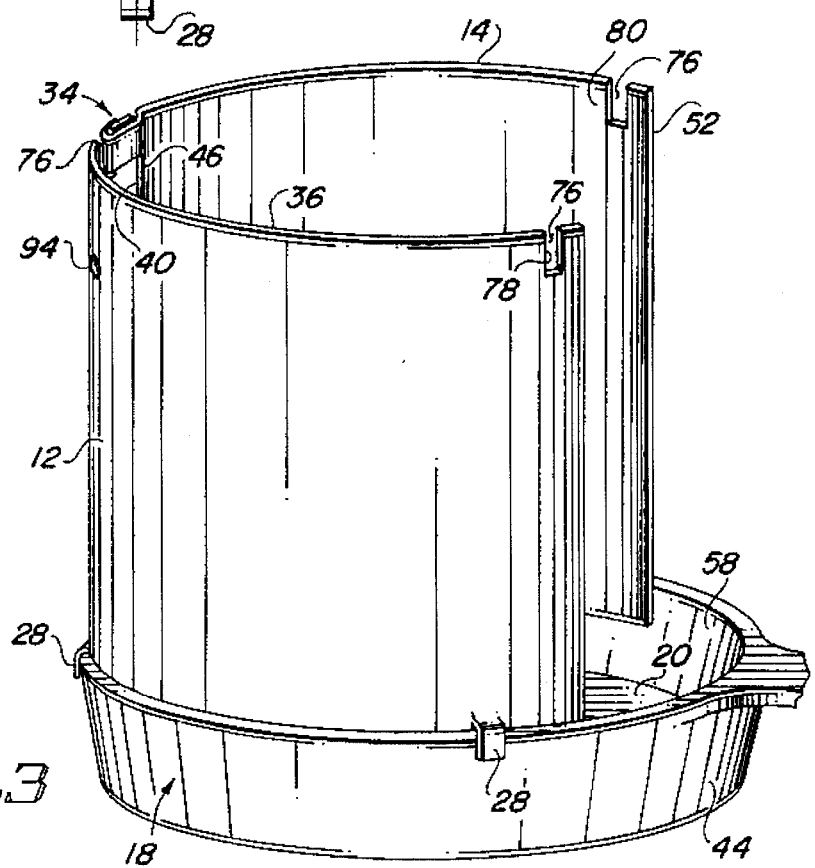
FIG. 3 is a partial perspective view of the shield cooperating with the pan wherein a shield segment is removed for providing access to the cooking surface through the shield side wall.

Further, in the preferred embodiment, a cord dimension 54 from the third segment left 48 to right 50 side edge is sufficient for maneuvering a standard spatula (not shown) while accessing the pan cooking surface 20 as illustrated with reference to FIGS. 2 and 3. The removal of the third segment 16 providing a shield side wall opening 56 defined by the cord dimension 54 as illustrated with reference to FIG. 3.

Now with reference to FIGS. 4 through 7, detailed features of the shield 10 are further described. Each of the shield segments 12, 14, 16 have their bottom edges cooperate to form the shield lower edge 26 as illustrated again with reference to FIGS. 1 and 2 as earlier described. As illustrated with reference to FIGS. 4 and 5, the lower edge 26 loosely fits within the pan side wall 44. When a frying pan 18 has a side wall 44 inclined outward as illustrated with reference to FIG. 4, the lower edge 26 will loosely rest on the side wall inner surface 58 and typically be held above the cooking surface 20 while biased against the side wall surface 58. To assure that the shield 10 is held suspended away from the cooking surface 20, the preferred embodiment of the present invention comprises extension tabs 28 as earlier described and as illustrated by way of example with reference to FIG. 5. Again with reference to FIGS. 1 through 3, the tabs 28 are cut from the shield segments and extend sufficiently radially outward from the shield 10 to cooperate with pans of slightly varying diameters. As illustrated by way of example with reference to FIG. 5, the weight of the shield 10 is such to permit each tab 28 to suspend the shield above the cooking surface 20 while holding the shield 10 within and loosely against the pan side wall surface 58. The tabs 28 cooperate with pan side walls 44 having various configurations as illustrated by way of example with reference again to FIGS. 4 and 5. With such an arrangement, splattered grease (not shown) collecting on the shield wall inner surface 60 is allowed to flow under the influence of gravity along the side wall 60 and onto the cooking surface 20.

With reference to FIG. 6, a tab pair 62 extends from a side edge portion 64 proximate the shield segment lower edge 26 and forms a bifurcated tabs separated from each other for receiving an adjacent segment edge 66 between the tab pair 62 thereby aligning the adjacent side edges (by way of example 50 and 52 or others as earlier described). With reference to FIG. 7, a hook 68 cooperating with a slot 70 of a typical hook and slot assembly 34 as earlier described, is further detailed. In the preferred embodiment, a hook shaped tab 72 extends from left 48 and right 50 shield segments proximate the shield segment top edge 74 as illustrated with reference to FIG. 1 and detailed by way of example with reference to FIG. 7. The third segment hook shaped tabs 72 cooperate with slots 76 cut within top edge portions 78 and 80 respectively of the first 12 and second 14 segments proximate their right 42 and left 52 side edges respectively as further illustrated with reference to FIG. 8 and detailed by way of example with reference to FIG. 7. As illustrated in FIG. 7, the tab 72 is further formed to provide a generally smooth transition along each edge by providing a bent portion 82 for permitting the hook shaped tab 72 to form around the slotted edge portion 84. The first shield segment 12 further has a slot 86 within its top edge 88 for cooperating with a hook shaped tab 90 extending from the second segment right edge 46 in the same manner as herein described. The weight of shield segments 14 and 16 cause the tab pairs 32 to hold each segment 14 and 16 in place as they hang from their respective hook and slot assemblies 34.

Figure 8:
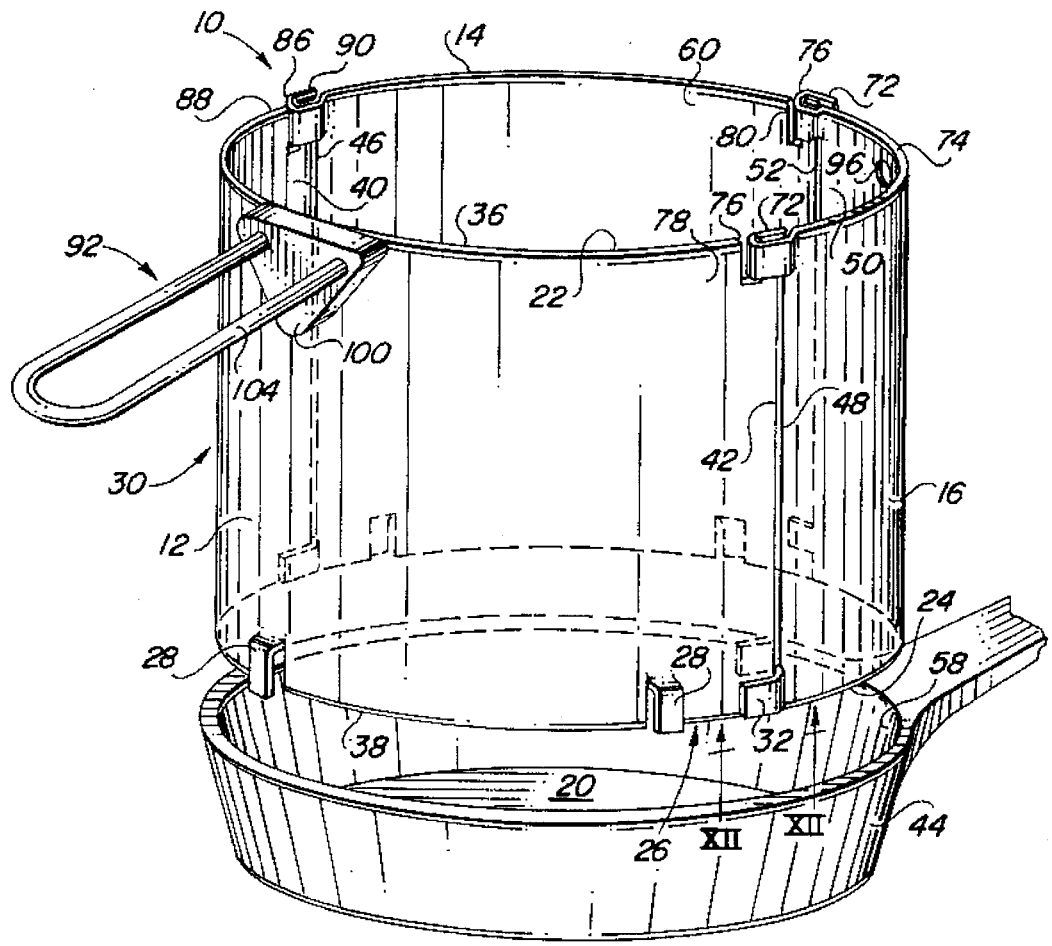
FIG. 8 is an exploded perspective view of the shield and removable handle cooperating with the frying pan for placement and removal of the full shield.

As illustrated with reference to FIG. 8, such an attaching arrangement of segments 12, 14 and 16 as just described, permits lifting of the shield 10, all segments 12, 14, 16 in combination using a handle 92 affixed to the first segment 12 only. In addition, by affixing the handle to the third segment 16, only the third segment 16 will be removed for providing the access to the pan cooking surface 20 as earlier described and as illustrated in FIG. 3.

In the preferred embodiment of the present invention, the holes 94 and 96 are positioned within the first 12 and third 16 shield segments proximate their respective top edges as illustrated again with reference to FIGS. 1, 3 and 8. Further, description of the handle 92 and the cooperating holes 94, 96 is herein provided with reference to FIGS. 9, 10, and 11. The handle 92 of the present invention comprises a plate 98 having opposing first and second surfaces 100, 102. A grip 104 is affixed to and extends from the first surface 100. A first pin or rod 106 extends generally perpendicular form the second surface 102 and is dimensioned for fitting within the shield segment holes 94, 96. A second pin or rod set 108 extends generally outward from the plate second surface 102 with each pin 108 having a bent end 110 for biasing against a segment inner surface portion 112 as the pin set 108 extends over the segment top edge 114 proximate the hole 94 or 96 while permitting the first pin 106 to penetrate the hole 94 or 96 as illustrated with reference to FIG. 10. Once inserted as illustrated with reference to FIG. 11, lifting the handle 92 causes the second pin set 108 to bias its bent ends 110 against the shield segment inner surface 112 while biasing the plate second surface 102 against a shield segment outer surface portion 116 for lifting the shield 10 or a segment as earlier described.

Again with reference to FIG. 2, the present invention places the holes 94 and 96 symmetrically opposing each other along a line 118 passing through the shield cylindrical center 120. The hole 96 placed within the third shield segment 16 is centered between edges 48, 50 to provide balance of the shield segment 16 when being held using the handle 92. Further, by having the hole 94 within the first shield 12 located along the line 118 passing through the center 120 and the third shield hole 96, balance of the shield 10 is achieved when using the handle in hole 42 for maneuvering the shield 10 with or without the third segment 16 in place. Thus, balance about the line 118 is provided when either the shield 10 or the combination of the first 12 and second 14 segments is removed without the third segment 16 in place. With a removable handle 92, the same handle 92 can be used to place and remove the shield 10 on and off the pan 18, remove or replace segments 12, 14, 16 and be removed for convenience during cooking.

While a specific embodiments of the invention have been described in detail herein above, it is to be understood that various modifications may be made from the specific details described herein without departing from the spirit and scope of the invention as set forth in the appended claims.

Having now described the invention, the construction, the operation and use of preferred embodiments thereof, and the advantageous new and useful results obtained thereby, the new and useful constructions, methods of use and reasonable mechanical equivalents thereof obvious to those skilled in the art, are set forth in the appended claims.

What is claimed is:

1. A frying pan shield comprising:

a shield segment set having walls formed substantially about a pan perimeter portion within a pan side wall inside surface, each segment wall extending generally perpendicular to a pan bottom surface portion, wherein each shield segment wall receives splattering grease from food cooking on the bottom surface and permits the grease to flow along its walls onto the bottom surface, each shield segment further having generally vertical side edges proximate a corresponding shield side edge for enclosing the pan bottom surface within the shield side walls, each shield segment further having lower and upper side edges, the lower edges closely fitting within the pan perimeter portion, the upper edges forming a top opening; and means for removably connecting shield segments, the connecting means holding one side edge along an adjacent side edge.

2. The shield as recited in claim 1, further comprising means for removably coupling the shield segments to the pan side walls, the coupling means suspending the segments above the pan bottom surface, the coupling means further holding the segments proximate the pan side wall inside surface.

3. The shield as recited in claim 2, wherein the suspending means comprise extension tabs integrally formed within segment lower edges, the tabs formed from partially cut out lower edge segments formed for coupling onto a pan side wall top edge.

4. The shield as recited in claim 1, wherein the connecting means comprises a generally hooked shaped tab extending from one side edge portion, the tab engaging a slot formed within a top edge portion of an adjacent segment.

5. The shield as recited in claim 1, further comprising handle means for removably attaching to the shield, the handle means for manipulating at least one shield segment of the shield segment set.

6. The shield as recited in claim 5, wherein the handle means comprises:

one shield segment having a hole proximate its top edge;

a handle having a gripping end and an opposing attachment end;

a rod extending from the attachment end, the rod dimensioned to be received by the hole;

a stop affixed to the rod for limiting penetration of the rod into the hole; and hook means extending from the attachment end, the hook means dimensioned for attaching over one segment top edge and cooperating with the rod for removably attaching the handle means to that shield segment, the rod penetrating the hole while biasing the stop against a segment outside wall, the hook means biasing against the segment inside wall while lifting the segment.

7. The shield as recited in claim 1, wherein each shield segment forms a generally rigid arcuate shape for cooperating with an arcuate pan side wall portion, each segment cooperating with the cooperating side wall portion for shielding areas outside the pan from grease splattering over the pan side wall portion.

8. The shield as recited in claim 1, wherein each shield segment is made from a flexible material sufficiently flexible for forming a shape to an operable shield position defined by the pan side wall perimeter shape, the segments sufficiently rigid for holding the operable shield position.

9. A frying pan shield useful in preventing splatter onto a stove, the shield comprising:

a first shield segment dimensioned to partially surround a first perimeter portion of a fry pan side wall;

a second shield segment dimensioned to surround a second perimeter portion of the fry pan side wall, the first and second segments fully encompassing the side wall, the segments loosely biased against a side wall inside surface, the first and second shield portions having a height dimension extending sufficiently above a pan bottom cooking surface for preventing splattering from the cooking surface onto a stovetop upon which the pan is placed; and means for connecting the first shield segment to the second shield segment, the connecting means permitting the first and second segments in combination to be removed, the connecting means further permitting the second segment to be removed from the pan second perimeter portion independently of the first segment.

10. The shield as recited in claim 9, further comprising handle means for removably attaching to the first shield segment for removing the shield and further for removably attaching to the second shield segment for removing the second segment.

11. The shield as recited in claim 9, wherein the first and second shield segments form a shield top perimeter portion having an opening formed generally to a perimeter opening of the pan side wall.

12. The shield as recited in claim 9, wherein the second shield segment is sufficiently wide for receiving a cooking utensil for servicing the food within the pan while the first shield portion is in place on the pan first perimeter portion.

13. The shield as recited in claim 9, wherein the connecting means comprises:

extension tab pairs extending from second segment side edges proximate second shield bottom perimeter portion, each tab pair receiving a first segment side edge portion between the tabs for holding a first segment side edge in general alignment with a corresponding second segment side edge;

slots cut within first segment top edge portions proximate top segment side edges;

a hook member extending from each second segment side edge proximate a second segment top edge, each hook member dimensioned for cooperating with each corresponding slot for connecting the segments, whereby the shield segments are connected to form the pan shield about the pan side wall perimeter.

14. A fry collar useful for confining splattering grease to within a frying pan, the collar comprising:

a first shield segment having top, bottom and side edges, the first shield segment having a surface contour for cooperating with a first portion of a frying pan side wall, the first shield segment having a lower edge for positioning within the pan side wall thereby permitting splattering grease collecting on an inner surface of the first shield segment to flow under the effects of gravity downward onto a pan cooking surface, the shield segment lower edge loosely fitting within the pan side wall, the first shield segment further having side edges dimensioned for cooperating with contiguous shield segments for surrounding the pan cooking surface, the first shield segment further having a slot opening from the top edge proximate each of the side edges, the slot positioned for cooperating with a hook for connecting the contiguous shield segments;

a second shield segment having top, bottom and side edges, the second shield segment having a surface contour for cooperating with a second portion of a frying pan side wall, the second shield segment having a lower edge for positioning within the pan side wall thereby permitting splattering grease collecting on an inner surface of the second shield segment to flow under the effects of gravity downward onto the pan cooking surface, the second shield segment lower edge loosely fitting within the pan side wall, the second shield segment further having side edges dimensioned for cooperating with contiguous shield segments for cooperating in surrounding the pan cooking surface, the second shield segment further having a hook shaped tab extending from one side edge proximate the top edge, the hook shaped tab dimensioned for attaching with one slot of the first shield segment positioned side edge to side edge adjacent the second shield segment, the second shield segment further having a slot opening from the top edge proximate an opposing edge to the hook shaped tab, the slot positioned for cooperating with a hook shaped tab of a contiguous hooked shaped tab; and a third shield segment having top, bottom and side edges, the third shield segment having a surface contour for cooperating with a third portion of a frying pan side wall, the third shield segment having a lower edge for positioning within the pan side wall thereby permitting splattering grease collecting on an inner surface of the third shield segment to flow under the effects of gravity downward onto a pan cooking surface, the third shield segment lower edge loosely fitting within the pan side wall, the third shield segment further having side edges dimensioned for cooperating with contiguous shields for surrounding the pan cooking surface, the third shield segment further having a hook shaped tab extending from each side edge proximate the top edge, the hook shaped tabs dimensioned for attaching with corresponding slots of the first and second shield segments positioned side edge to side edge adjacent the third shield, the three shield segments in combination forming the collar for surrounding the pan cooking surface, the hook shaped tabs and slots in combination permitting the third shield segment to be lifted generally upward away from the pan for disconnecting the hook shaped tabs from the slots for singly removing the third shield segment, and further in combination, the hook shaped tabs and slots permitting the first shield segment to be lifted from the pan for together removing the three shield segments.

15. The fry collar as recited in claim 14, further comprising tab pairs extending from shield segment side edges, one tab biasing against an inner surface of an adjacent shield segment, the other tab biasing against an opposing outer surface, the tab pair cooperating to engage the adjacent side edge between the tabs of the tab pair for aligning the adjacent side edges, the tab pairs further cooperating with the hook shaped tabs and slots for attaching adjacent shields to each other.

16. The fry collar as recited in claim 14, further comprising means for suspending the first and second shield segments out of direct contact with the pan cooking surface.

17. The fry collar as recited in claim 14, further comprising handle means and holes within the first and third shield segments for cooperating with the handle means in removing the shield segments in combination and the third shield segment singly.

18. The fry collar as recited in claim 17, wherein the handle means comprises:

a plate having opposing first and second surfaces;

a grip extending from the first surface;

a first pin extending generally perpendicular from the second surface, the first pin dimensioned for penetrating the shield holes;

a second pin extending generally perpendicular from the second surface, the second pin having a bent end for receiving the shield top edge while permitting the first pin to penetrate one shield hole, the second pin bent end biasing against an inner surface portion of the shield, the plate second surface biasing against an outer surface portion of the shield, thereby permitting the shield to be lifted by the grip generally extending outward from the shield.

19. A method for confining food splattering to within a frying pan thus preventing the splattering from covering adjacent areas outside the pan, the method comprising the steps of:

placing a frying pan upon a cook top for preparation of food within the pan, the pan having a bottom cooking surface and a perimeter side wall extending upward from the bottom surface;

placing first shield segments about a pan first perimeter side wall portion, the first shield segments having an inside surface for receiving frying splattering from food being cooked within the pan, the first shield segments further having a lower edge portion resting within the pan side wall wherein the splattering received by the shield flows downward and onto the pan bottom surface, the first shield segments placing step providing access to the pan bottom surface over a second remaining perimeter side wall portion;

placing a second shield segment within the second remaining perimeter side wall portion for fully surrounding the pan bottom surface, the second shield segment having an inside surface for receiving the splattering, the second shield segment further having a lower edge portion resting within the pan side wall, wherein the splattering received by the second shield segment flows downward and onto the pan bottom surface;

cooking the food placed onto the pan bottom surface;

attaching a handle to the second shield segment heated during the cooking step, the attaching step sufficient for removing the second shield segment;

removing the second shield segment;

accessing the food through an opening formed within the shield by passing a utensil over the second remaining perimeter side wall portion;

replacing the shield second segment while holding the handle for maneuvering the shield second segment;

removing the handle from the shield second segment;

completing the cooking step;

attaching the handle to the shield first segment for removing the shield form the pan; and removing the shield for accessing the food within the pan.

20. The method as recited in claim 19, further comprising the step of attaching shield segment extension tabs onto pan side wall top portions for suspending the shields above the pan bottom surface, the extension tabs extending generally radially outward from shield lower edge portions.

21. The method as recited in claim 19, wherein the shield placing steps further comprise the step of aligning the shield lower edges for providing a contiguous collar about the pan cooking surface.

22. The method as recited in claim 21, wherein the aligning step further comprises the steps of placing one shield edge between tabs of a bifurcated tab pair for holding that edge within the tabs, the tab pair extending outward from the shield side edge within an extending plane of the shield.

23. The method as recited in claim 19, wherein the shield segment placing steps further comprise the step of forming each shield segment for cooperating with a pan side wall contour, the shield segments sufficiently flexible for forming each shield yet sufficiently rigid for holding the countour.

24. The method as recited in claim 19, further comprising the steps of detaching each shield segment from each other and nesting the shield segments within each other for storing the segments.

* * * * *